(12) United States Patent
Satzger et al.

(10) Patent No.: US 9,919,581 B2
(45) Date of Patent: Mar. 20, 2018

(54) METHOD AND SYSTEM FOR PRECONDITIONING A HEATING AND/OR COOLING UNIT IN A MOTOR VEHICLE

(71) Applicant: Bayerische Motoren Werke Aktiengesellschaft, Munich (DE)

(72) Inventors: Peter Satzger, Landsberg am Lech (DE); Michael Nirschl, Kumhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 186 days.

(21) Appl. No.: 14/825,426

(22) Filed: Aug. 13, 2015

(65) Prior Publication Data
US 2015/0343882 A1 Dec. 3, 2015

Related U.S. Application Data

(63) Continuation of application No. PCT/EP2014/053039, filed on Feb. 17, 2014.

(30) Foreign Application Priority Data

Feb. 19, 2013 (DE) ........................ 10 2013 202 601

(51) Int. Cl.
*B60H 1/00* (2006.01)

(52) U.S. Cl.
CPC ..... *B60H 1/00778* (2013.01); *B60H 1/00007* (2013.01); *B60H 1/00828* (2013.01); *B60H 1/00842* (2013.01)

(58) Field of Classification Search
CPC ............ B60H 1/00778; B60H 1/00007; B60H 1/00828; B60H 1/00842
See application file for complete search history.

(56) References Cited

U.S. PATENT DOCUMENTS 7,823,399 B2 * 11/2010 Egawa ............... B60H 1/00735
165/204
8,672,022 B2 3/2014 Ostermeier et al.
(Continued)

FOREIGN PATENT DOCUMENTS

CN 101039812 A 9/2007
CN 101626911 A 1/2010
(Continued)

OTHER PUBLICATIONS

JPS608106 machine translation.*
CN101626911 machine translation.*
Chinese Office Action issued in Chinese counterpart application No. 201480009387.5 dated Sep. 26, 2016, with English translation (Fifteen (15) pages).
International Search Report dated Apr. 2, 2014 (Three (3) pages).
German Search Report dated Oct. 24, 2013, with Statement of Relevancy (Six (6) pages).
(Continued)

*Primary Examiner* — Len Tran
*Assistant Examiner* — Gordon Jones
(74) *Attorney, Agent, or Firm* — Crowell & Moring LLP

(57) ABSTRACT

The invention relates to a method and a system for preconditioning a heating and/or cooling unit in a motor vehicle while the motor vehicle is at a standstill. The heating and/or cooling unit draws energy to heat and/or cool the vehicle interior from an electrical store. While the vehicle is at a standstill, the heating and/or cooling unit is activated in a first power stage in response to a signal of a remote starting device, and is then switched from the first power stage to a second power stage based on specified conditions. The first power stage may be designed such that the heating and/or cooling circuit is internally preconditioned to reach a specified target temperature by appropriately controlling the heating and/or cooling unit with the ventilation flaps at least nearly closed.

11 Claims, 2 Drawing Sheets

(56) References Cited

U.S. PATENT DOCUMENTS

| | | | |
|---|---|---|---|
| 9,403,417 B2* | 8/2016 | Proefke | B60H 1/00642 |
| 2004/0194479 A1 | 10/2004 | Umebayashi et al. | |
| 2012/0234930 A1* | 9/2012 | Wijaya | G08C 17/00 236/51 |

FOREIGN PATENT DOCUMENTS

| | | |
|---|---|---|
| DE | 197 31 071 A1 | 1/1999 |
| DE | 199 53 498 C1 | 10/2000 |
| DE | 10 2005 004 950 A1 | 8/2006 |
| DE | 10 2007 012 420 A1 | 9/2008 |
| DE | 10 2008 023 416 A1 | 11/2008 |
| EP | 2 117 857 B1 | 8/2011 |
| FR | 2 780 144 A1 | 12/1999 |
| JP | 60-8106 A | 1/1985 |
| JP | S608106 A * | 1/1985 ............... B60H 1/00 |
| WO | WO 2007/023340 A1 | 3/2007 |
| WO | WO 2008/110298 A1 | 9/2008 |

OTHER PUBLICATIONS

Chinese Office Action issued in Chinese counterpart application No. 201480009387.5 dated May 25, 2017, with English translation (Fifteen (15) pages).

Chinese Notification of Third Office Action issued in Chinese counterpart application No. 201480009387.5 dated Nov. 16, 2017, with English translation (Twelve (12) pages).

* cited by examiner

METHOD AND SYSTEM FOR PRECONDITIONING A HEATING AND/OR COOLING UNIT IN A MOTOR VEHICLE

CROSS REFERENCE TO RELATED APPLICATIONS

This application is a continuation of PCT International Application No. PCT/EP2014/053039, filed Feb. 17, 2014, which claims priority under 35 U.S.C. § 119 from German Patent Application No. 10 2013 202 601.3, filed Feb. 19, 2013, the entire disclosures of which are herein expressly incorporated by reference.

BACKGROUND AND SUMMARY OF THE INVENTION

The invention relates to a method and a corresponding apparatus for preconditioning a heating and/or cooling unit of a motor vehicle at a standstill, the heating and/or cooling unit drawing its energy for heating and/or cooling from an electric store.

In order for it to be possible to control the temperature in an optimum manner of vehicles which are at a standstill, various apparatuses and methods are known at present. For instance, DE 197 31 071 A1 discloses a system for controlling the temperature of the vehicle interior of a motor vehicle at a standstill, in which the residual heat of a heat source and residual cold of a cold source which are still present in the vehicle are utilized.

Since the utilization of residual heat and/or residual cold is possible only when the heat sources and/or cold sources which are used for this purpose are in a state in which they can emit heat and/or cold, as a rule therefore immediately after (relatively long) operation of the motor vehicle, systems of this type are often not sufficient to make optimum temperature control of the vehicle interior at a standstill possible.

In addition to the stated apparatuses for controlling the temperature of the vehicle interior at a standstill, auxiliary heating units or parking heating units or electrically driven cooling devices are often used to heat or cool the vehicle at a standstill, which units or devices obtain their energy as a rule with the aid of internal combustion engines or thermal energy stores. Heating and/or cooling units of this type have considerable fuel consumption and, associated with this, high levels of pollutant emissions.

Novel vehicle concepts, in particular hybrid vehicles, suggest the approach of utilizing the necessary energy for operating the heating and/or cooling units at a standstill from the existing electric energy stores. For instance, DE 10 2005 004 950 A1 discloses an air conditioning system for a hybrid vehicle, in which air conditioning system the pre-air conditioning is made possible by means of an electric refrigerant compressor which is already serially present in the system and is actuated by a traction battery of the vehicle. Although systems of this type have the advantage that pre-air conditioning is possible without emissions from an internal combustion engine or a fuel-powered heating unit, the pre-air conditioning is possible only for a limited time period on account of the storage capacities of the electric stores. As soon as the charging state lies or falls below a predefined limit value, pre-air conditioning is not possible (any longer), since otherwise the operation of the motor vehicle might be jeopardized. This leads to considerable comfort sacrifices for the driver.

EP 2 117 857 B1 has already disclosed a method for pre-air conditioning of a motor vehicle at a standstill by means of a heating and/or cooling unit which draws its energy from an electric store of the vehicle, it being possible for the heating and/or cooling unit to be operated at at least two performance levels. Here, when the heating and/or cooling unit of the parked vehicle is initially activated, the heating and/or cooling unit is initially operated at a first performance level with a low energy consumption, and is switched from the first performance level to the second performance level with a higher energy consumption only when a vehicle door is unlocked or opened.

It is an object of the invention to improve the abovementioned method with regard to the energy consumption, with optimum air conditioning of the vehicle being taken into consideration.

This object is achieved by way of a method and system of the independent. Advantageous developments arise from the dependent claims.

A basic concept of the invention is that in principle an excessive amount of energy must not be used in the case of pre-air conditioning at a standstill of the vehicle (and/or when the vehicle is locked and left), in which the energy for pre-air conditioning the vehicle interior is drawn from electric stores, in order for it to continue to be possible to ensure complete functional capability of the vehicle. If, however, only weakened interior preconditioning is performed, the customer loses a large part of the preconditioning effect as a result of one or more vehicle doors being opened. The interior very rapidly feels too warm or too cold on account of the surfaces being temperature controlled to too little an extent.

Based on this, the method according to the invention for preconditioning a heating and/or cooling unit in a motor vehicle at a standstill, in which the heating and/or cooling unit draws its energy for heating and/or cooling from an electric store, is in principle configured in such a way that, when the vehicle is at a standstill, the heating and/or cooling unit is initially activated at a first performance level upon a signal of a remote starting device and is switched from the first performance level to a second performance level of the heating and/or cooling unit only depending on predefined conditions. According to the invention, the first performance level is configured in such a way that, in the case of ventilating flaps which are at least virtually closed, internal preconditioning of the air in order to reach a predefined setpoint temperature is performed by way of corresponding actuation of the heating and/or cooling unit within the heating and/or cooling circuit. In other words, only or virtually only the air within the heating and/or cooling unit is temperature controlled correspondingly at the first performance level. The complete or virtually complete closure of the ventilating flaps prevents the air which has already been temperature controlled from escaping into the vehicle interior and the heating and/or cooling unit having to start from the beginning again with the air quantity which is newly sucked in and is hardly preconditioned precisely at the beginning of the temperature control.

Here, the activation of the preconditioning of the heating and/or cooling unit by means of the remote starting device (at the first performance level) can take place in various ways. Thus, for example, the remote starting device can be part of a separate radio remote control or can be integrated into the key unit. As an alternative, the remote starting device can also be part of a software function which is integrated into a smartphone or tablet PC.

This method may be suitable, in particular, in vehicles with an electric drive, in which the electric energy for the drive is drawn from an electric store.

Furthermore, in the method according to the invention, the fan is advantageously deactivated or is operated only with low performance at the first performance level for internal preconditioning of the heating and/or cooling unit, since operation is not necessary on account of the (virtually) closed ventilating flaps. In addition, no additional energy or only a small amount of additional energy is used as a result of the deactivation of the fan or the operation of the fan with low performance.

If, during the first performance level for internal preconditioning of the heating and/or cooling unit in order to reach the predefined setpoint temperature, the setpoint temperature or a value which correlates with the setpoint temperature is reached or exceeded, the actuation of the heating and/or cooling unit can be ended or interrupted at least temporarily in one advantageous development of the invention. If, in the case of ended or interrupted actuation of the heating and/or cooling unit during the first performance level, the temperature within the heating and/or cooling unit deviates from the setpoint temperature or a value which correlates with the setpoint temperature by more than a predefined differential value, or if a defined time interval has elapsed, the actuation is advantageously activated again, with the result being that it can be ensured that there is sufficient preconditioning of the heating and/or cooling unit, and therefore rapid air conditioning of the vehicle interior upon activation of the second performance level is achieved.

A further aspect of the invention lies at the switchover time from the first performance level to the second performance level. Since the switchover time should be selected in such a way that the driver, as soon as he/she enters the vehicle, is to be given the feeling that his/her desire for pre-air conditioning of the vehicle interior has been taken into account, a switchover is then carried out from the first performance level to the second performance level in one advantageous refinement of the invention if the trunk or a vehicle door, preferably the driver's vehicle door, is unlocked or opened. Depending on the configuration of the unlocking system of the motor vehicle, unlocking of the vehicle takes place if the driver actuates a corresponding operating element of a remote control unit, if a radio unit is detected within a predefined region around the vehicle, or if the vehicle is unlocked manually by means of a key at the lock of a door or the trunk. It can be fixedly predefined whether an activation of the second performance level takes place during unlocking of the vehicle or during opening of a vehicle door or the driver's vehicle door, or takes place depending on the charging state of the electric store. In the case of a low charging state, the switchover operation from the first performance level to the second performance level may not take place until as late as possible, preferably only when the driver's door of the motor vehicle is opened.

In order for it to be possible to ensure that the driver finds or assumes an optimally temperature controlled vehicle interior when entering the vehicle, this feeling has to be imparted to the driver by way of a corresponding second performance level. The second performance level is advantageously configured in such a way that the ventilating flaps which have been at least virtually closed up to this point are opened and/or the fan performance is increased, with the result being that the air which is pre-temperature controlled within the heating and/or cooling unit exits into the vehicle interior. As a result, the driver immediately has the requested cold or warm air available at the vents, without a large amount of energy being necessary in the run-up. Viewed subjectively, the vehicle user therefore experiences a greater effect than in the case of pre-air conditioning known from the prior art, with only low energy consumption.

In order for it to be possible to ensure, furthermore, that the air is preconditioned to an optimum extent within the heating and/or cooling unit, the system according to the invention for preconditioning the heating and/or cooling unit in the motor vehicle at a standstill according to the above-described method is configured in such a way that an air return means for returning the conditioned air to the intake section of the fan is provided within the heating and/or cooling unit. Said air return means results in an at least virtually closed air circuit, through which the air can circulate during the first performance level.

It can advantageously also be ensured by way of a corresponding configuration of the system that the preconditioned air can circulate within the heating and/or cooling unit merely at the first performance level. Thus, a pressure relief valve can advantageously be provided at the inlet of the air return means, which pressure relief valve opens at a correspondingly great air pressure, with the result being that the preconditioned air can flow through the air return means to the intake section of the fan. This correspondingly high pressure is set when the ventilating flaps are at least virtually closed and therefore the path into the vehicle interior is shut off.

As an alternative, instead of the pressure relief valve, an electrically actuatable valve can also be provided at the inlet of the air return means, which valve is partially or completely open at least temporarily during the first performance level.

The method according to the invention and a possible apparatus for carrying out the method according to the invention will now be explained in greater detail in accordance with one exemplary embodiment.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
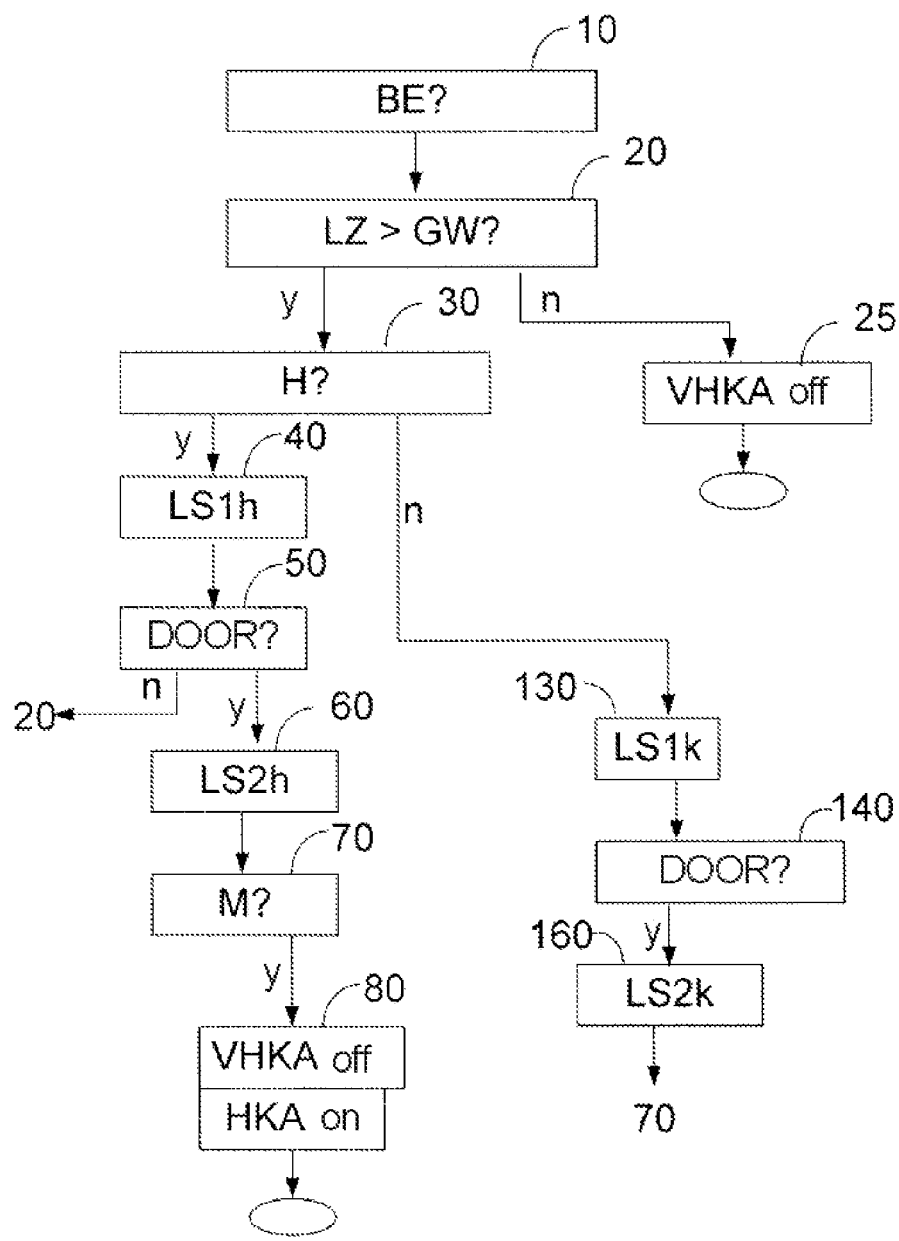
FIG. 1 shows a simplified exemplary flow diagram of the method according to the invention for preconditioning a heating/cooling unit of a motor vehicle at a standstill.

It is assumed in principle in this example that the heating/cooling unit draws the energy for pre-air conditioning the vehicle interior from an electric store which at the same time is used to start the motor vehicle and partially also for an electric motor which serves as drive unit. Here, the method according to the invention is implemented in a control unit for controlling and/or regulating the heating/climate control unit as a routine.

The method for preconditioning the heating/cooling unit of the motor vehicle at a standstill is started in step 10 when the heating/cooling unit for pre-air conditioning his/her vehicle at a standstill is activated by the driver by means of a vehicle-external operating element BE. The operating element BE can be integrated into a separate radio remote control or into a key unit, it being possible for a common or separate operating element BE to be provided for starting a heating operation and for starting a cooling operation. A further activation possibility exists by way of a smartphone. For the sake of simplicity, merely one operating element BE will be addressed in the following text.

After the driver has expressed his/her desire for pre-air conditioning by way of actuation of the operating element BE, a check is made in step 20 as to whether the charging state LZ of the electric store which is used for pre-air conditioning of the vehicle exceeds a predefined limit value GW. Here, the limit value GW is predefined in such a way that activation of the heating/cooling unit does not lead to any impairment of the starting operation of the vehicle. If the charging state LZ of the electric store undershoots the predefined limit value GW, a transition is made to step 25. The heating/cooling unit is not activated or, if it had previously been activated, it is deactivated in step 25. The method or the routine is ended.

If the charging state LZ of the electric store exceeds the limit value GW, a check is made in step 30 as to whether the driver desires heating H or cooling of the vehicle interior. This can be determined, for example, by virtue of a check being made as to whether the driver has actuated the operating element BE for heating or the operating element BE for cooling. As an alternative, upon activation of the operating element BE, a preset setpoint value can be compared with the actual value of the vehicle interior temperature or a comparable temperature and it can be derived therefrom whether a heating or cooling mode is required.

If the driver desires heating H of the vehicle interior, a first heating performance level LS1$h$ of the heating/cooling unit is activated in step 40. Said first heating performance level LS1$h$ is configured in such a way that, in the case of at least virtually closed ventilating flaps, the heating/cooling unit is preconditioned internally by way of corresponding actuation within the heating circuit in order to reach a setpoint temperature which is predefined by the driver. At the same time as internal preconditioning, the fan of the heating/cooling unit is operated only with low performance, with the result being that only a small amount of energy is required, but at the same time sufficient air circulation within the heating/cooling unit can be ensured. In order that the air can circulate satisfactorily within the heating/cooling unit, an air return means (described in greater detail in FIG. 2) is optionally provided for guiding the heated air back to the intake section of the fan of the heating/cooling unit.

After activation of the first heating performance level LS1$h$, an enquiry is made in the next step 50 as to whether the driver's door DOOR is being opened. If the driver's door DOOR is not being opened, the routine jumps back again and again to step 20. As a result, the charging state LZ of the electric store is continuously interrogated, with the result being that the pre-air conditioning can optionally be interrupted if the charging state LZ falls below the limit value GW. If the charging state LZ is sufficient, the heating/cooling unit is operated correspondingly at the first heating performance level LS1$h$.

It is not shown here but it is likewise conceivable that a check is made in step 20 as to whether the preconditioned air has already reached the setpoint temperature. If this is the case, the first heating performance level can be deactivated at least temporarily, in order for it to be possible to save energy further.

As soon as it is detected in step 50 that the driver's door DOOR of the vehicle is being opened, the transition is made to step 60. There, a second heating performance level LS2$h$ of the heating/cooling unit is activated. The second heating performance level LS2$h$ is configured in such a way that the virtually closed ventilating flaps are now opened and possibly the fan performance is increased, with the result being that the driver is subjected to blowing with the air which has already been pre-temperature controlled to his/her requirements when entering the vehicle interior. As a result, at least the feeling that the vehicle interior has already been pre-temperature controlled according to his/her wishes is imparted to him/her.

After activation of the second heating performance level LS2$h$, an inquiry is made in the next step 70 as to whether the vehicle or the engine M has been started. As soon as the engine M is started, a transition is made from step 70 to step 80, the pre-air conditioning VHKA is ended there and the conventional air conditioning HKA is activated.

If the driver does not desire heating H of the vehicle interior, but rather cooling, a first cooling performance level LS1$k$ is activated in step 130. Said first cooling performance level LS1$k$ is configured such that, in an analogous manner to heating, in the case of at least virtually closed ventilating flaps, the heating/cooling unit is preconditioned internally by way of corresponding actuation within the heating/cooling circuit in order to reach a setpoint temperature which is predefined by the driver. At the same time, for internal preconditioning, the fan of the heating/cooling unit is operated only with low performance, with the result being that only a small amount of energy is required, but at the same time it is ensured that sufficient air circulation within the heating/cooling unit is ensured.

After activation of the first cooling performance level LS1$k$, an enquiry is made in the next step 140 as to whether the driver's door DOOR is being opened. If the driver's door DOOR is not being opened, the routine jumps back again to step 20. As a result, the charging state LZ of the electric store is continuously interrogated, with the result being that the pre-air conditioning can optionally be interrupted if the charging state LZ falls below the limit value GW. If the charging state LZ is sufficient, the heating/cooling unit is operated at the first cooling performance level LS1$s$.

As soon as it is detected in step 140 that the driver's door DOOR of the vehicle is being opened, a transition is made to step 160. There, a second cooling performance level LS2$k$ of the heating/climate control unit is activated. Said second cooling performance level LS2$k$ is configured such that the heating/climate control unit now cools the vehicle interior with high performance. After activation of the second cooling performance level LS2$k$, a transition is made to step 70 and the routine (as already described above) is continued or is ended with starting of the engine M. As a result, optimum cooling of the vehicle interior is ensured.

The method which is described here is intended to be only a greatly simplified example. Of course, further system parameters can be interrogated and necessary system interventions can be performed correspondingly. This operating strategy can also be coupled with other strategies, for example with ventilating strategies via lowering of the windows, opening of the sliding roof, activation of the seat heating and/or with strategies for battery cooling at a standstill; however, the charging state of the electric store always has to be taken into consideration.

Figure 2:
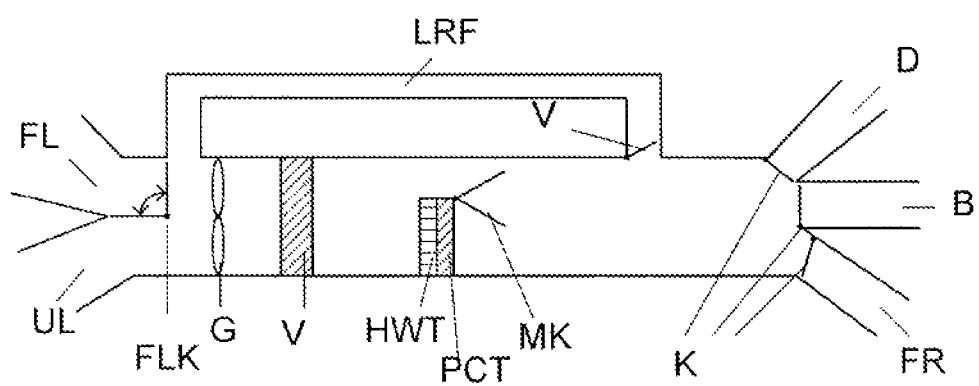
FIG. 2 shows a simplified system for carrying out the abovementioned method.

FIG. 2 now shows a simplified system for carrying out the abovementioned method. Here, a conventional heating and cooling unit is shown in simplified form which sucks in either fresh air FL or circulated air UL by means of the fan G arranged downstream of it depending on predefined conditions by way of corresponding positioning of the fresh air flap FKL. Depending on the setting of a mixing flap MK, the air which is sucked in is guided via an evaporator V and a unit which is arranged downstream of the evaporator V and comprises a heating heat exchanger HTW and optionally what is known as a PCT element, and is heated or cooled as a result in accordance with the requirement.

In the case of conventionally configured heating/air conditioning systems, the temperature controlled air is then guided into the vehicle interior directly via the defrost D and/or ventilating B and/or footwell F duct by way of corresponding positioning of the defrost, ventilating and footwell flaps K.

In order for it to be possible to achieve satisfactory preconditioning of the air within the heating/cooling unit by way of corresponding actuation at the first performance level in the case of at least virtually closed ventilating flaps K, an air return means LRF for guiding back the (conditioned) heated and/or cooled air to the intake section of the fan G is provided within the heating/cooling unit. A virtually closed air circuit is therefore formed, by the air being circulated and thus pre-temperature controlled in an optimum manner.

In order for it to be possible to ensure that the air flows through the ventilating flaps K into the vehicle interior and not through the air return means again to the intake section of the fan G at the second performance level and also during normal operation of the heating/air conditioning system, a valve V is provided at the inlet of the air return means, which valve V opens or is opened at the first performance level, with the result being that the heated or cooled air can flow through the air return means LRF to the intake section of the fan G. Said valve can be configured as a simple pressure relief valve which opens when a defined air pressure is reached, or as an electrically actuable valve. The electrically actuable valve can be opened, closed or held in any desired intermediate position here depending on the current performance level and/or in accordance with the required conditions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for preconditioning a heating and/or cooling unit in a motor vehicle at a standstill, the method comprising the acts of:
    drawing energy, by the heating and/or cooling unit, in order to heat and/or cool a cabin of the motor vehicle from an electric store of the motor vehicle;
    activating, when the vehicle is at the standstill, the heating and/or cooling unit at a first performance level in response to a signal from a remote starting device;
    closing ventilating flaps such that air from the heating and/or cooling unit is virtually prevented from entering the vehicle cabin while the heating and/or cooling unit is active at the first performance level; and
    switching the heating and/or cooling unit from the first performance level into a second performance level based on predefined conditions,
    wherein via activating the heating and/or cooling unit at the first performance level and closing the ventilation flaps, air of a heating and/or cooling circuit is preconditioned internally so as to reach a predefined setpoint temperature by way of a corresponding actuation of the heating and/or cooling unit.

2. The method as claimed in claim 1, wherein a fan is deactivated or is operated only with low performance at the first performance level for internal preconditioning of the heating and/or cooling circuit.

3. The method as claimed in claim 1, wherein, during the first performance level for internal preconditioning of the heating and/or cooling circuit in order to reach the predefined setpoint temperature, the method further comprises ending or interrupting at least temporarily actuation of the heating and/or cooling unit in the event the setpoint temperature is reached or exceeded within at least one of the heating and/or cooling unit or vehicle air ducts.

4. The method as claimed in claim 3, wherein, in the case of an ended or interrupted actuation of the heating and/or cooling unit during the first performance level, the method further comprises activating again the heating and/or cooling unit in the event the temperature within the heating and/or cooling circuit deviates from the setpoint temperature by more than a predefined differential value and/or if a predefined time interval has elapsed.

5. The method as claimed in claim 1, further comprising switching over from the first performance level to the second performance level in the event a vehicle door is unlocked or opened.

6. The method as claimed in claim 4, further comprising switching over from the first performance level to the second performance level in the event a vehicle door is unlocked or opened.

7. The method as claimed in claim 1, wherein the second performance level is configured such that the at least virtually closed ventilating flaps are opened and/or the fan performance is increased.

8. The method as claimed in claim 4, wherein the second performance level is configured such that the at least virtually closed ventilating flaps are opened and/or the fan performance is increased.

9. A system for preconditioning a heating and/or cooling unit of a motor vehicle at a standstill, which heating and/or cooling unit is controllable in accordance with the method of claim 1, wherein an air return passage for returning the heated and/or cooled air to the intake section of a fan is provided within the heating and/or cooling circuit.

10. The system as claimed in claim 9, wherein a pressure relief valve is provided at the inlet of the air return passage, which pressure relief valve opens at a predetermined air pressure, whereby the heated or cooled air flows through the air return passage to the intake section of the fan.

11. The system as claimed in claim 9, wherein an electrically actuatable valve is provided at the inlet of the air return passage, the electrically actuatable valve being partially or completely open at least temporarily during the first performance level, whereby the heated or cooled air flows through the air return passage to the intake section of the fan.

* * * * *